Nov. 20, 1956     A. L. WILLIAMS     2,771,538
WELDING APPARATUS
Filed June 16, 1953
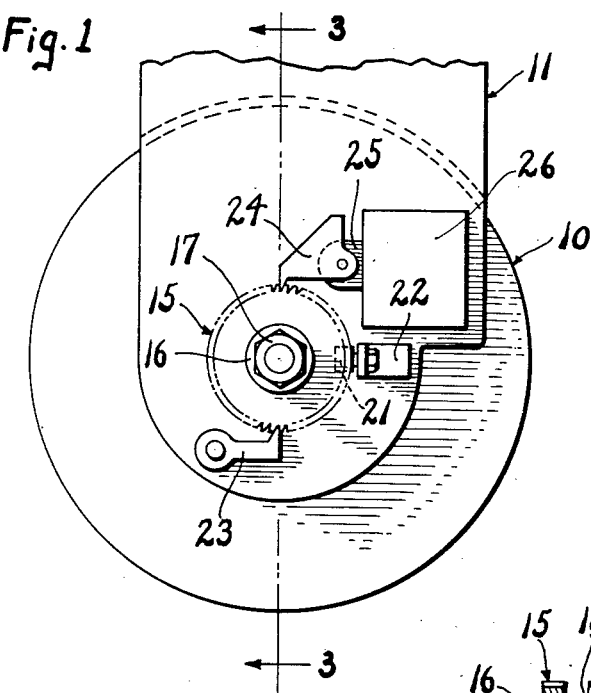
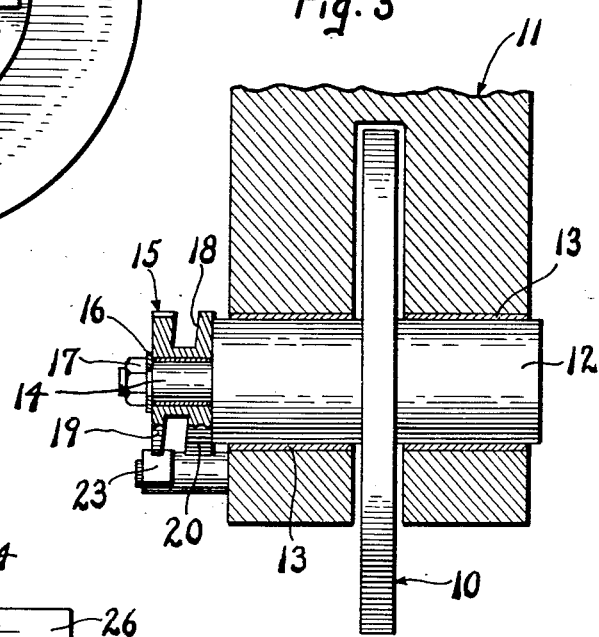
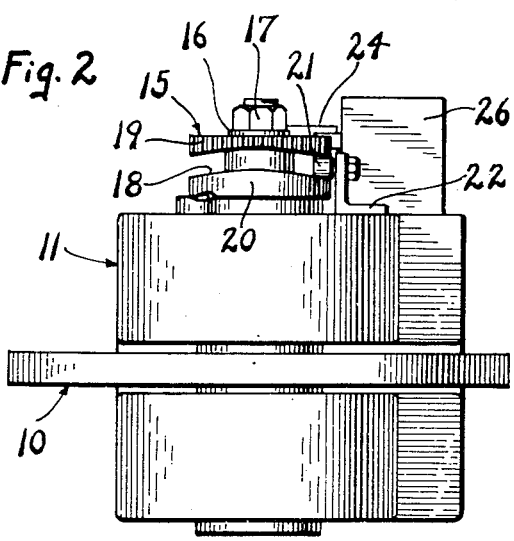
INVENTOR.
ARTHUR L. WILLIAMS
BY
Attorney United States Patent Office 2,771,538
Patented Nov. 20, 1956

2,771,538

WELDING APPARATUS

Arthur L. Williams, Warren, Ohio, assignor to The Federal Machine and Welder Company, Warren, Ohio, a corporation of Ohio Application June 16, 1953, Serial No. 362,069

12 Claims. (Cl. 219—78)

My invention relates to seam welder apparatus, more particularly to apparatus for distributing wear evenly across the face of a seam welding wheel, and the principal object of my invention is to provide new and improved apparatus of the character described.

In the past, one of the most troublesome maintainance problems attendant in production seam welding has been the uneven rate of wear across the face of the welding wheels. This is due to the fact that the welding wheel usually overlaps an edge of the material being welded and therefore the high pressure and temperatures attendant with seam welding are concentrated at one place on the face of the wheel. As is well known, continuous welding tends to deform the face of the wheel and to therefore quickly destroy its original contour so that frequent dressing of the wheel is required.

Attempts have been made to reduce the frequency of the time-consuming wheel-dressing operation by distributing wear more evenly across the face of the welding wheel by shifting the wheel axially. Various types of mechanisms have been employed to effect shifting of the wheel; however, none of these devices have been satisfactory since most of them caused a lateral force to be exerted upon the juxtaposed edges of the material being welded and this had a tendency to shift such edges relative to one another thus causing a poor weld.

My invention provides apparatus that will distribute wear evenly across the face of a welding wheel without reducing the efficiency or accuracy of the weld in any way. These and other advantages will become apparent from a study of the following description and of the drawing appended hereto.

In the drawing accompanying this specification and forming a part of this application there is shown, for purpose of illustration, an embodiment which my invention may assume, and in this drawing:

Figure 1 is a fragmentary elevational view of a seam welder head embodying my invention, Figure 2 is a bottom plan view of the embodiment illustrated in Figure 1, certain parts being broken away in the interest of clarity, and Figure 3 is a sectional view generally corresponding to the line 3—3 of Figure 1.

Conventional seam welders of the type generally disclosed in Letters Patent 2,486,592, dated November 1, 1949, generally comprise a pair of welding wheels each having peripheral engagement with the other and each disposed so that its axis is substantially parallel with the other. Each wheel is usually rotatably carried by a welding head and the heads are yieldably urged together by any suitable means. The material to be welded is adapted to be fed between the wheels and welded by current that is passed between the wheels through the material. It is believed that the foregoing brief description of conventional seam welders will be sufficient background for an understanding of the present invention.

As shown in the drawing, my invention is adapted for use with a seam welder having a welding wheel 10 carried by a head 11. Although only one head is shown, it is to be understood that another head similar to the one illustrated will be employed so that the wheels carried by respective heads form a pass through which the material to be welded may be fed.

As best seen in Figure 3, the wheel 10 is secured to a shaft 12 that is rotatable in spaced-apart bearings 13, 13 carried by the head 11. The shaft 12 has a reduced diameter portion 14 extending axially from one end thereof and a drum cam 15 is journaled on the portion 14 and is secured in position by any suitable means; for example, the portion 14 may have its free end threaded to receive a thrust washer 16 and a locking nut 17 as shown.

From the foregoing it will be clear that the cam 15 and the shaft 12 are secured together for unitary movement in an axial direction but that they are each independently rotatable. The cam 15 has an endless helical groove 18 formed in its periphery, the groove stopping short of the ends of the cam to provide oppositely disposed flange portions 19, 20. The flange portion 19 has teeth formed in its periphery (see Figures 1 and 3) for a purpose to be shown.

As shown in Figures 1 and 2, a cam follower 21 is disposed in the groove 18 of the cam 15 and the cam follower is supported by a bracket 22 that is welded or otherwise secured to the head 11.

A pawl 23 is pivotally secured to the head 11 and is engageable with the teeth formed in the flange 19 of the cam 15, the pawl being yieldably urged to engage the teeth in the flange by means of a spring or the like (not shown). A pawl 24 is also engageable with the teeth formed in the flange 19, this pawl, in the presently disclosed embodiment, being pivotally secured to a piston rod 25 that extends from a fluid operated cylinder 26. Although not shown, a spring or the like may be employed to yieldably urge the pawl 24 into engagement with the teeth of the flange 19, and it will be obvious that means other than the cylinder 26 could be employed to shift the pawl 24, for example, a solenoid or other suitable mechanism could be employed for this purpose.

It will be clear that when the piston rod 25 is shifted to the left (as viewed in Figure 1) by means of the cylinder 26, the pawl 24 will effect rotation of the cam 15 in a counterclockwise direction an amount depending upon the stroke of the cylinder 26. It will also be clear that when the piston 25 returns the pawl 24 to the starting position shown in Figure 1, reverse rotation of the cam 15 will be prevented by the pawl 23.

From the foregoing, it will be clear that the wheel 10 and the cam 15 may each rotate independently of the other. However, each time the cam 15 is rotated by means of the pawl 24, the cam together with the shaft 12 and the wheel 10 will be forced to shift in an axial direction because of the cam follower 21 that is held in fixed relation with respect to the head 11. Accordingly, the wheel 10 will be indexed axially first in one direction and then in the other in response to rotation of the cam 15.

Operation of my invention during welding will now be described, it being understood that only one welding wheel and its associated parts are herein disclosed: The material to be welded will be fed between the wheels 10 that are ordinarily power driven to rotate in opposite directions by means not shown. However, the wheels need not be power driven but may be rotated in response to the tangential forces caused by the material being fed therebetween.

When the material to be welded enters between the wheels, welding current will be caused to flow from one wheel to the other by any suitable means. These means may comprise a switch that will be actuated by movement of the wheels away from each other as they are forced apart by the material to be welded. Welding will progress in the usual manner, the wheels 10 being held against axial movement by the cam 15 presently locked against rotation by the pawls 23, 24.

Upon completion of a weld, that is, when the welded material has passed from between the welding wheels and before the next portion of material to be welded has entered between the wheels, the cylinder 26 may be actuated. Actuation of the cylinder 26 may be effected by a switch responsive to the movement of the wheels toward each other after a weld has been completed. A switch of this type; that is, one responsive to movement of the welding wheels toward and away from each other is disclosed in Letters Patent 1,750,050, dated March 11, 1930.

As previously described, actuation of the cylinder 26 will rotate the cam 15 a limited amount and this will index the wheel 10 in an axial direction in the manner hereinbefore disclosed. The wheel 10 will then remain in this axial position until completion of the next weld whereupon it will once again be shifted. Obviously, since axial movement of the wheel occurs only between welds, no lateral forces are present during the welding operation to affect the quality of the weld.

In view of the foregoing it will be apparent to those skilled in the art that I have accomplished at least the principal object of my invention and it will also be apparent to those skilled in the art that the embodiment herein disclosed may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A seam welder construction, comprising a support, a shaft journaled in said support for both rotational and axial movement, a weld wheel fixedly secured to said shaft and movable therewith, means having a cam-like surface carried by said shaft and movable axially therewith, said means and said shaft being rotatable relative to one another, follower means secured to said support and engageable with said cam-like surface, and means for selectively rotating the means having a cam-like surface for shifting said shaft in an axial direction to distribute wear evenly across the face of said wheel.

2. A seam welder construction, comprising a support, a shaft journaled in said support for both rotational and axial movement, a weld wheel fixedly secured to said shaft and movable therewith, a drum cam carried by said shaft and movable axially therewith, said cam and said shaft being rotatable relative to one another, follower means secured to said support and engageable with the cam surface of said cam, means selectively holding said cam against rotation with respect to said support, and means selectively operable to rotate said cam with respect to said support and shift said shaft in an axial direction to distribute wear evenly across the face of said wheel.

3. A seam welder construction, comprising a support, a shaft journaled in said support for both rotational and axial movement, a weld wheel fixedly secured to said shaft and movable therewith, a drum cam carried by said shaft and movable axially therewith, said cam and said shaft being rotatable relative to one another, follower means secured to said support and engageable with the cam surface of said cam, and ratchet means in part carried by said cam and selectively operable to rotate said cam with respect to said support and shift said shaft in an axial direction to distribute wear evenly across the face of said wheel.

4. In a seam welder construction having a pair of welding faces disposed in adjoining operating relation wherein such welding faces are forceably but yieldably urged toward each other but are adapted to be sprung apart against the urging force upon entry of material to be welded therebetween, the combination comprising wheel means providing one of the welding faces, said wheel means being supported for rotation about an axis and also being shiftable in the direction of its axis, and means for effecting axial movement of said wheel means upon movement of the welding faces toward each other following the exit of material from therebetween.

5. In the art of distributing wear transversely across the working face of a seam welder wheel which successively engages and welds a procession of pieces of material, the method which comprises effecting axial movement of the seam welder wheel in an amount equal to a fraction of its total working face during the interval between the completion of a weld in one piece of material and the initiation of a weld in the next successive piece of material.

6. In the art of seam welding, the method of distributing wear transversely across the working face of a seam welder wheel which intermittently engages material to be welded, which method comprises feeding the material along a path transverse to the axis of rotation of said welder wheel for rolling engagement with a portion of the transverse extent of said working face, and relatively moving said path and said welder wheel in a direction transverse of said path in an amount equal to a fraction of the total working face of said welder wheel and at a time when said welder wheel is out of engagement with the material to thereby present another portion of the transverse extent of said working face for rolling engagement with the material.

7. In the art of seam welding, the method of distributing wear transversely across the working face of a seam welder wheel which intermittently engages material to be welded, which method comprises feeding the material along a path transverse to the axis of rotation of said welder wheel for rolling engagement with a portion of the transverse extent of said working face, and shifting said welder wheel axially in an amount equal to a fraction of its total working face and at a time when said welder wheel is out of engagement with the material to thereby present another portion of the transverse extent of said working face for rolling engagement with the material.

8. In the art of seam welding, the method of distributing wear transversely across the working face of a seam welder wheel, which method comprises feeding articles to be welded successively and in spaced relation along a path transverse to the axis of rotation of said welder wheel for rolling engagement with said working face, and shifting said welder wheel axially in an amount equal to a fraction of its total working face and during the interval between the welding of succeeding articles to thereby present different portions of said working face for rolling engagement with successive articles.

9. In a seam welder, the combination of a shaft mounted for rotational and axial movement, a weld wheel fixed to said shaft for rotational and axial movement therewith, a member rotatably mounted on said shaft but held to axial movement therewith, said member having a surface at an angle to the axis of said shaft, and means fixed in position for engagement with said member surface, rotation of said member relative to said fixed means providing a wedging force which shifts said shaft axially.

10. In a seam welder having a pair of welding faces providing a welding pass through which a plurality of articles are fed in spaced relation, the combination comprising a shaft mounted for rotational and axial movement, a weld wheel, the peripheral surface of which provides one of said welding faces, said weld wheel being fixed to said shaft for rotational and axial movement therewith, and means shifting said shaft axially an amount equal to a fraction of the transverse extent of the peripheral surface of said weld wheel during the interval between the welding of spaced articles.

11. In a seam welder, the combination of a shaft mounted for rotational and axial movement, a weld wheel fixed to said shaft for rotational and axial movement therewith, a drum cam rotatably mounted on said shaft but held to axial movement therewith, said drum cam having ratchet teeth on a peripheral surface, a stationary follower fitting within the cam groove of said drum cam, a first pawl yieldably engaging the ratchet teeth on said drum cam and holding the latter against rotation in one direction, a second pawl yieldably engaging the ratchet teeth on said drum cam, and actuator means for bodily moving said second pawl to rotate said drum cam in the opposite direction, such rotation causing axial shifting of said shaft.

12. In a seam welder having a pair of welding faces providing a welding pass through which a plurality of articles are fed in spaced relation, the combination comprising a shaft mounted for rotational and axial movement, a weld wheel, the peripheral surface of which provides one of said welding faces, said weld wheel being fixed to said shaft for rotational and axial movement therewith, a drum cam rotatably mounted on said shaft but held to axial movement therewith, said drum cam having ratchet teeth on a peripheral surface, a stationary follower fitting within the cam groove of said drum cam, a first pawl yieldably engaging the ratchet teeth on said drum cam and holding the latter against rotation in one direction, a second pawl yieldably engaging the ratchet teeth on said drum cam, actuator means for bodily moving said second pawl to rotate said drum cam in the opposite direction, such rotation causing axial shifting of said shaft, and means timing actuation of said actuator means with the interval between the welding of spaced articles.

References Cited in the file of this patent

UNITED STATES PATENTS

| | | |
|---|---|---|
| 2,231,408 | Fechheimer et al. | Feb. 11, 1941 |
| 2,282,339 | Murch | May 12, 1942 |
| 2,558,041 | Cogan | June 26, 1951 |